US009466294B1

(12) United States Patent
Tunstall-Pedoe et al.

(10) Patent No.: US 9,466,294 B1
(45) Date of Patent: Oct. 11, 2016

(54) DIALOG MANAGEMENT SYSTEM

(71) Applicant: Amazon Technologies, Inc., Reno, NV (US)

(72) Inventors: William Tunstall-Pedoe, Cambridge (GB); Andrew Graham Fenn, Cambridge (GB); Robert Peter Stacey, Halstead (GB); Adam John Philip Wood, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 13/899,171

(22) Filed: May 21, 2013

(51) Int. Cl.
*G06F 17/30* (2006.01)
*G10L 15/22* (2006.01)

(52) U.S. Cl.
CPC ......... *G10L 15/22* (2013.01); *G06F 17/30654* (2013.01)

(58) Field of Classification Search
CPC ................................................ G06F 17/30654
USPC ........................................................ 707/708
See application file for complete search history.

(56) References Cited

U.S. PATENT DOCUMENTS

| 7,013,308 | B1 | 3/2006 | Tunstall-Pedoe |
| 7,707,160 | B2 | 4/2010 | Tunstall-Pedoe |
| 8,219,599 | B2 | 7/2012 | Tunstall-Pedoe |
| 8,468,122 | B2 | 6/2013 | Tunstall-Pedoe |
| 8,666,928 | B2 | 3/2014 | Tunstall-Pedoe |
| 8,719,318 | B2 | 5/2014 | Tunstall-Pedoe |
| 8,838,659 | B2 | 9/2014 | Tunstall-Pedoe |
| 9,098,492 | B2 | 8/2015 | Tunstall-Pedoe |
| 9,110,882 | B2 | 8/2015 | Overell et al. |
| 2007/0043708 | A1 | 2/2007 | Tunstall-Pedoe |
| 2007/0055656 | A1 | 3/2007 | Tunstall-Pedoe |
| 2009/0070284 | A1 | 3/2009 | Tunstall-Pedoe |
| 2009/0192968 | A1 | 7/2009 | Tunstall-Pedoe |
| 2010/0205167 | A1 | 8/2010 | Tunstall-Pedoe |
| 2011/0071819 | A1* | 3/2011 | Miller et al. ..................... 704/9 |
| 2011/0307435 | A1 | 12/2011 | Overell et al. |
| 2012/0036145 | A1 | 2/2012 | Tunstall-Pedoe |
| 2013/0253913 | A1 | 9/2013 | Tunstall-Pedoe |
| 2013/0254182 | A1 | 9/2013 | Tunstall-Pedoe |
| 2013/0254221 | A1 | 9/2013 | Tunstall-Pedoe |

(Continued)

FOREIGN PATENT DOCUMENTS

WO    WO 2007/083079    7/2007

OTHER PUBLICATIONS

U.S. Appl. No. 13/896,078, filed May 16, 2013, Tunstall-Pedoe.
U.S. Appl. No. 13/896,144, filed May 16, 2013, Tunstall-Pedoe.

(Continued)

*Primary Examiner* — Alexey Shmatov
(74) *Attorney, Agent, or Firm* — Weaver Austin Villeneuve & Sampson LLP

(57) ABSTRACT

Techniques for facilitating transactions are described in which the system facilitating the transaction engages in natural language dialog with the user to achieve the desired result. Instead of treating successive input independently, the system maintains a dialog context in which information generated in response to recent input may be used to inform responses to further input.

22 Claims, 3 Drawing Sheets

(56) References Cited

U.S. PATENT DOCUMENTS

| | | |
|---|---|---|
| 2013/0262125 A1 | 10/2013 | Tunstall-Pedoe |
| 2013/0275121 A1 | 10/2013 | Tunstall-Pedoe |
| 2014/0316764 A1* | 10/2014 | Ayan .................. H04M 3/4936 704/9 |
| 2014/0351281 A1 | 11/2014 | Tunstall-Pedoe |
| 2015/0039292 A1* | 2/2015 | Suleman ............... G06F 17/289 704/9 |
| 2015/0356463 A1 | 12/2015 | Overell et al. |

OTHER PUBLICATIONS

U.S. Appl. No. 13/896,611, filed May 17, 2013, Tunstall-Pedoe.
U.S. Appl. No. 13/896,857, filed May 17, 2013, Tunstall-Pedoe.
U.S. Appl. No. 13/896,878, filed May 17, 2013, Tunstall-Pedoe.
U.S. Appl. No. 13/925,246, filed Jun. 24, 2013, Holmes.
U.S. Appl. No. 13/925,627, filed Jun. 24, 2013, Tunstall-Pedoe et al.
U.S. Appl. No. 13/943,637, filed Jul. 16, 2013, Tunstall-Pedoe et al.
U.S. Appl. No. 14/828,176, filed Aug. 17, 2015, Overall et al.

* cited by examiner

DIALOG MANAGEMENT SYSTEM

BACKGROUND

Online tools for filling information needs are becoming increasingly sophisticated. As these tools have evolved, the relevance of discovered information, e.g., search results, have improved while the requirements of users in terms of adhering to syntactical rules (e.g., use of Boolean operators) continue to decrease. Some tools are now capable of interpreting and responding to natural language input. However, these tools generally operate according to a simple query-response model in which a user formulates a query and the tool responds, with the response being determined solely by the user's query. Given the inherent variability and ambiguity of natural language, this model can lead to a frustrating user experience when the tool cannot understand the user's input and/or does not have sufficient information to generate a useful response.

DETAILED DESCRIPTION

Figure 1:
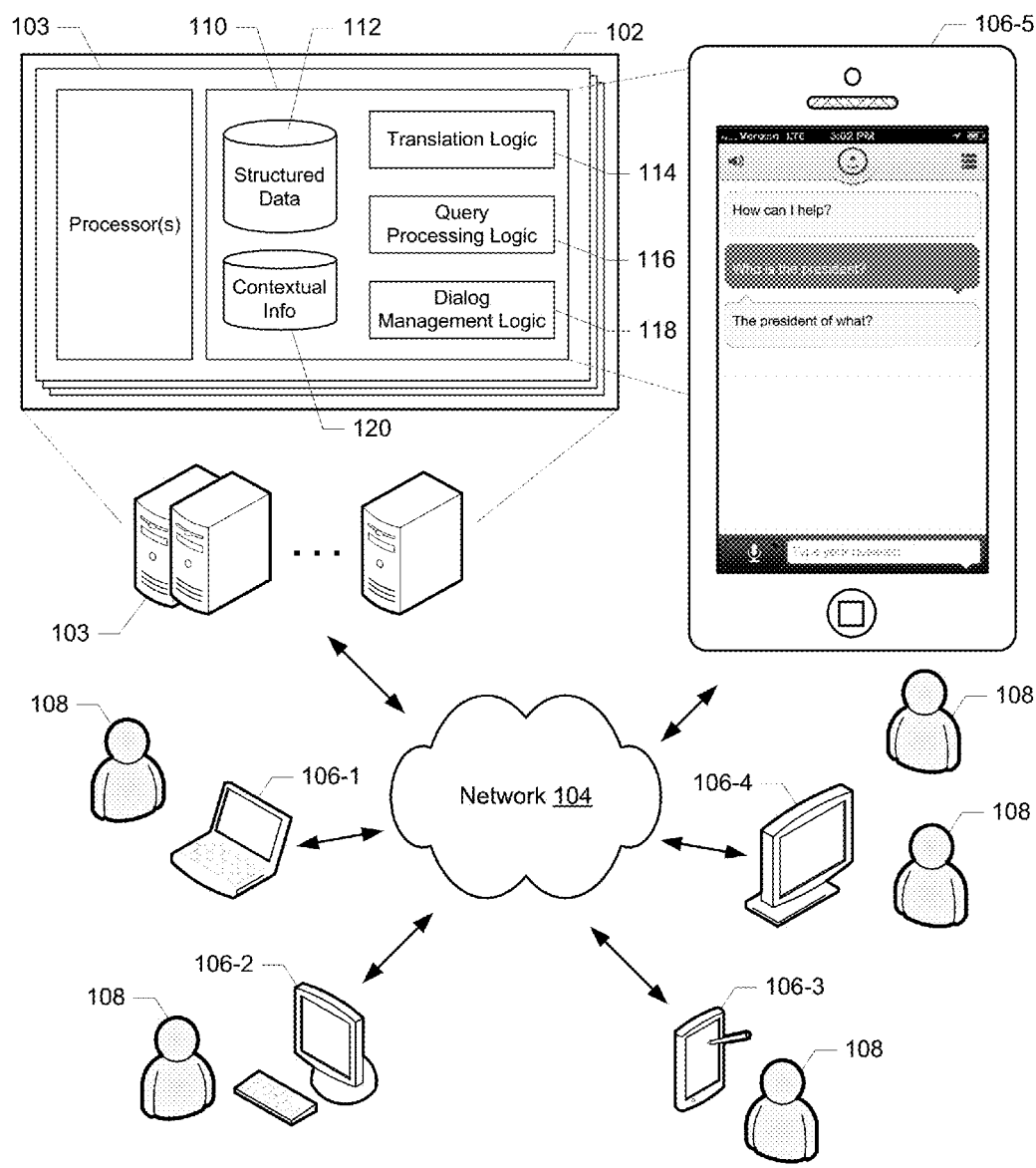
FIG. 1 illustrates an example of a computing environment in which dialog management techniques may be employed.

This disclosure describes techniques for responding to natural language input to fill an information need or facilitate a transaction in which the system filling the information need or facilitating the transaction is configured to participate in a dialog with the user to achieve the desired result. Instead of treating successive natural language input independently, the system maintains a dialog context in which information generated in response to recent input may be used to inform responses to further input. In addition, where useful or necessary, the system can resort to alternative strategies for obtaining information necessary to fill the information need or complete the transaction including, but not limited to, requesting information from the user. According to a particular class of implementations, the system resorts to the user only where it cannot get the information it needs from an alternate source.

An example will be illustrative. In this example, a user asks a question of a question answering service in response to which the service asks the user for additional input and handles ambiguous terms by tracking the dialog context.

User: Who is the president?
System: The president of what?
User: Who is the president of the US?
System: Barack Obama.
User: How old is he?
System: Barack Obama was born on Aug. 4$^{th}$ 1961. That makes him 51 years, 8 months and 20 days old today.
User: How old is Britney Spears?
System: Britney Spears was born on Dec. 2$^{nd}$ 1981. That makes her 31 years, 5 months and 22 days old today.
User: Who is her mother?
System: Lynne Spears
User: How old is she?
System: Lynne Spears was born on May 4$^{th}$ 1955. That makes her 57 years, 11 months and 20 days old today.

In response to the user's initial question, the system resorts to requesting additional information from the user (i.e., by asking "The president of what?") because only the user knows the intent of his question in this regard. Once the needed information is provided (e.g., in the user's restatement of the original question) the answer may be provided from, for example, an underlying knowledge base.

When the user then asks "How old is he?" the system refers to a dialog context of stored contextual information to identify the person to whom the indefinite pronoun "he" likely refers, and responds accordingly without requesting further information from the user. This is to be contrasted with conventional question answering tools in which the tool would have responded to the same question with a canned response indicating that the question was either not understood or not answerable as posed.

In response to the next question about the age of pop star Britney Spears, the system recognizes a change in the dialog context which is reflected in its subsequent and accurate interpretation of the possessive pronoun "her" as referring to the same entity and the generation of an appropriate response. A further change in the dialog context is recognized in the system's interpretation of the pronoun "she" in the next question from the user as no longer referring to the pop star, but to her mother Lynne. Thus, because of its ability to track and understand changes in context, and to generate natural language requests for information from the user, the system is able to engage in a dialog with the user to fill the user's information needs in a flexible and, from the user's point of view, natural manner.

FIG. 1 illustrates an example of a computing environment in which transactions may be facilitated by a service 102 (e.g., a knowledge representation system, a search engine, an online encyclopedia, an online retailer, a messaging system, etc.) via network 104 interacting with a variety of client devices (106-1 through 106-5) associated with users 108. Service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by service 102. Such device may include, for example, mobile devices (e.g., cell phones, smart phones, and tablets), personal computers (e.g., laptops and desktops), set top boxes (e.g., for cable and satellite systems), smart televisions, gaming consoles, etc. More generally, at least some of the examples described herein contemplate various distributed computing implementations. The term "distributed computing" refers to computing models capable of enabling ubiquitous, convenient, on-demand network access to a shared pool of computing resources (e.g., networks, servers, storage, applications, and services).

It should also be noted that, despite references to particular computing paradigms and software tools, the computer program instructions on which various implementations are based may correspond to any of a wide variety of programming languages, software tools and data formats, and may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

According to a particular class of implementations, service 102 is an information service for filling information needs (e.g., question answering, keyword searching, etc.) using a knowledge base 110 that stores information as structured data 112. Knowledge base 110 includes translation logic 114 which translates between natural language and an internal format that is compatible with structured data 112. That is, translation logic 114 translates natural language input (e.g., captured speech or entered text received from device 106-5) to internal queries that are then processed with reference to structured data 112. Translation logic 114 also translates responsive data from structured data 112 and/or its own internal queries requiring further input to natural language for presentation to the user (e.g., on device 106-5). Query processing logic 116 processes internal queries generated by translation logic 114 with reference to structured data 112 to generate responses which may then be translated to natural language by translation logic 114.

Knowledge base 110 also includes dialog management logic 118 which is configured to manage the dialog between the user and information service 102 (with reference to contextual information 120) to fill the user's articulated information need. It should be noted that implementations are contemplated in which some or all of knowledge base 110 of FIG. 1 may reside on either or both of client device 106-5 and servers 103 (as indicated by the dashed lines in FIG. 1). For example, dialog management logic 118 and contextual information 120 might reside on client device 106-5 and communicate over the intervening network(s) with translation logic 114 and query processing logic 116. In another example, virtually everything but structured data 112 might reside on a client device. In yet another example, an application on client device 106-5 might provide only sufficient interface functionality necessary to communicate with the back-end functionality of the knowledge base. The scope of the invention should therefore not be limited with reference to the specific implementations described herein.

According to various implementations, computing systems are enabled that allow users interacting with the systems to fill information needs or conduct transactions using dialog, including natural language conversation. As used herein, a "conversation" is a sequence of utterances by the system and a user interacting with the system. An "utterance" refers to a natural language word, phrase, or sentence(s) generated by the system or the user that may be presented in text, or may be audible (e.g., using speech-to-text or text-to speech translation). A "question" is a type of utterance for which the intent is to obtain information. Questions may but are not required to start with question words (e.g., what, where, why, etc.). A "command" is an utterance for which the intent is to get the other party (i.e., the system or the user) to take an action or perform a task.

According to a particular class of implementations, conversation is supported through the tracking of contextual information (e.g., 120 of FIG. 1). That is, a conversation may have an associated context that is a changing record of information pertinent to (and associated with) the currently live conversation that affects the system's understanding and responses. For example, recently referenced entities that are the subject of the conversation can be referred to with potentially ambiguous terms, e.g., "her", "that business," etc. in subsequent utterances. In another example, the fact that the system is waiting for a response from the user is tracked. Other information such as, for example, the identity or location of the user may also be an important part of the context.

Questions or commands included in a conversation can be in both directions, e.g., the system may need to ask clarifying questions or ask the user to perform a task and recognize the user's response. Outstanding system questions may form an important part of the context. User utterances may need to be judged as to whether they are answers to previous questions or new system questions, or whether they can be categorized as so-called "sugar statements." Sugar statements include utterances by either party that are neither questions, responses to questions, or commands but may otherwise facilitate the conversation and/or enhance the impression of the system being an intelligent friend, e.g., "Thank you," "Hello William. Happy Birthday," "Wow," "I can't sleep," "Goodnight," "I'll try again later," etc. As appropriate such utterances may elicit no response or generate a scripted response.

According to some implementations, a conversation need not follow strict turn taking. For example, a user may ignore a system question and instead ask something unrelated. Or the system may answer a question and then immediately ask the user whether the answer was a good response to their question. The system may also start conversations.

According to a particular class of implementations, the system in which dialog management as described herein is supported (e.g., service 102 of FIG. 1) is implemented as a knowledge representation system as described, for example, in U.S. Patent Publication No. 2007/0043708 entitled Knowledge Storage and Retrieval System and Method, and U.S. Patent Publication No. 2007/0055656 entitled Knowledge Repository, the entire disclosure of each of which is incorporated herein by reference for all purposes. However, it will be understood that the various functionalities described herein are much more widely applicable. That is, for example, dialog management may be provided in support of any of a variety of services that fill information needs (e.g., search engines, online encyclopedias, etc.), as well as any type of service that facilitates any of a wide variety of transactions (e.g., online retailers, financial institutions, communication or messaging systems, etc.). The scope of the invention should therefore not be limited to knowledge retrieval.

An example of the operation of specific implementation of dialog management logic will now be described with reference to the flow diagram of FIG. 2 and the computing environment of FIG. 1. The depicted implementation follows the example conversation described above in which a user initiates the conversation with a natural language utterance (in this case, "Who is the president?") either by entering text or speaking into device 106-5 (202). The input might be a question as shown. Alternatively, the input might be a command, e.g., where the user would like the system to perform an action in support of a particular type of transaction.

Contextual information relating to the conversation is either created or updated to reflect the current state of the conversation (204). Contextual information may be generated or derived in a variety of ways and originate or be obtained from a wide variety of sources. For example, contextual information may include information relating to the conversational context such as, for example, recent entities to which the conversation has referred and object classes associated with such entities, as well as whether the system or the user is expecting a response from the other party. Contextual information may also include personal profile information, e.g., the identity of the user, the user's preferences, contacts, online behaviors, etc. Contextual information may also include information relating to the physical context, e.g., the location of the user, the time of day, etc. Contextual information may be temporary (e.g., maintained only during the current conversation), or persistent (e.g., maintained beyond the current conversation). The latter might be useful where information obtained during a conversation has significance or value beyond the conversation such as, for example, the user's contact information or date of birth. More generally, contextual information represents information the system may use to understand utterances in a conversation and appropriately tailor its responses.

From the natural language input the system generates one or more queries that have a machine-readable format compatible with one or more sources of information available to the system for responding to the natural language input (206), e.g., the information or transaction services referred to above. If the one or more queries do not require further information to complete them (208), they are processed with reference to the relevant available information source and an appropriate natural language response to the natural language input is generated (210).

On the other hand, if the system requires further information to complete the one or more queries before they are processed (208), e.g., the quer(ies) include one or more unsatisfied variables, the system determines whether it can satisfy the query variable(s) from one or more available information sources (212, 214). Such information sources might include, for example, an underlying knowledge base (e.g., knowledge base 110 of FIG. 1) which, in the illustrated example, is the primary information source to which the system refers to generate its responses to natural language input. For example, the system might recognize the name of a celebrity in the natural language input that is represented in the underlying knowledge base and satisfy a query variable on that basis. Other information sources might include remote sources of information such as, for example, data stored on or generated by the client device (e.g., GPS location information, user contact or calendar information, etc.), or data stored or generated on a third-party platform (e.g., a social network or portal).

Figure 2:
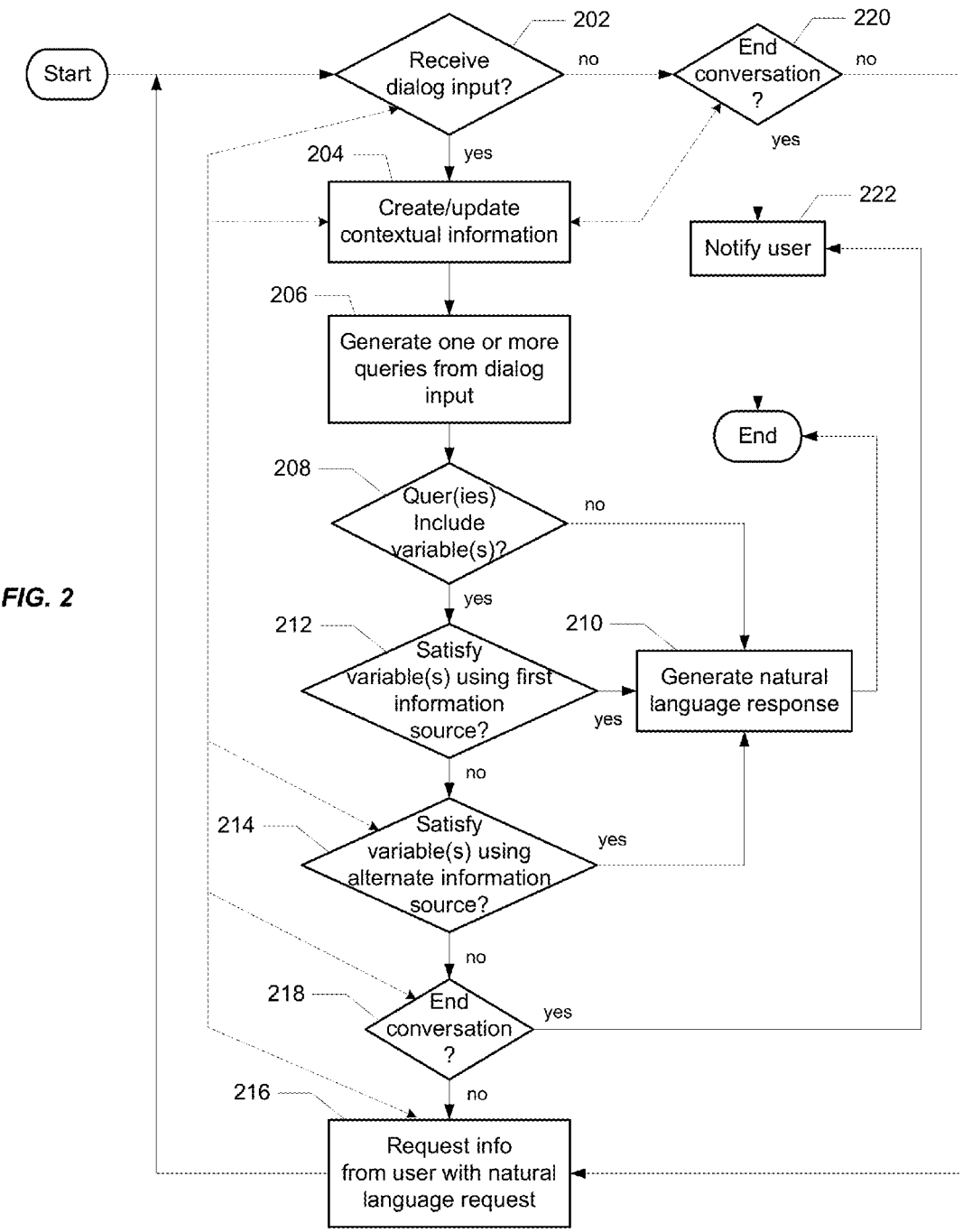
FIG. 2 illustrates an example of a process for responding to natural language input.

As indicated by the dashed line between 204 and 214 in FIG. 2, another information source to which the system may refer is the contextual information associated with the conversation. That is, by maintaining suitable contextual information relating to the current conversation (examples of which are described herein), the system may resolve apparent ambiguities (e.g., as represented by unknown variables in a query) without having to resort to requesting the missing information from the user or obtaining the missing information from some other source. Examples of the use of contextual information are described above. Further examples are provided below.

If all query variables can be satisfied from any of the available sources, an appropriate natural language response to the natural language input may be generated (210).

A special case of an available information source is the user himself. That is, if the system is unable to satisfy the query variable(s) from the available information source(s) without resorting to requesting the information from the user, it may generate a natural language request for the missing information for presentation to the user (216), e.g., on client device 106-5 of FIG. 1. According to a particular implementation, the natural language request is generated from the query for which a variable needs to be satisfied. That is, just as the machine-readable query may be generated from natural language input, the natural language request to the user to supply missing information represented by a query variable may be generated from a machine-readable query.

The contextual information is updated to reflect the fact that a response is expected from the user as indicated by the dashed line between 216 and 204. According to some implementations, the input from the user that form part of a dialog may include something other than natural language input to support the desired transaction. That is, while a dialog may include natural language conversation, it may also include a much broader range of input types that may be used to facilitate the desired transaction. For example, the input might be a scanned barcode for a product, audio input for music recognition, an image for image processing, a retrieved data record, etc.

At one or more points during a conversation, the system may determine that the conversation should be terminated (e.g., at 218 or 220). It should be noted that the point(s) in the flow at which such a decision could be made may vary considerably with the placement of 218 and 220 being examples. If the decision is made to terminate the conversation, an appropriate notification to the user may be sent (222). For example, the system might generate a natural language notification indicating to the user that the conversation is being terminated, e.g., "It appears that you are no longer interested in your question about Tanzania. Feel free to try again later." Further, and as indicated by the dashed lines connecting 204 with 218 and 220, a decision to terminate might be informed by or based on contextual information indicating the user has moved on or otherwise lost interest. For example, a long period of time may have passed since information was requested from the user without further input being received. Alternatively, the user's lost interest might be inferred from received natural language input. For example, the user might say something like "Never mind," or change the subject by asking an unrelated question. Without the understanding of the current context, such input would not likely be understood.

As will be appreciated with reference to FIGS. 1 and 2, a framework is provided for collecting additional information necessary for completing a machine-readable query that is an accurate translation of a user's natural language input. As will also be appreciated, such an approach may be distinguished from conventional approaches to natural language disambiguation in that it works in situations in which disambiguation is not necessary, i.e., situations in which the user's intent is completely understood, but the system has no other way of obtaining missing information.

Previously, missing information (e.g., unknown query variables) would result in system responses such as "I don't know that," or "I don't understand your question." However, with implementations as described herein, such missing information may be resolved through an understanding of context and dialog. These implementations have the ability to recover from a failed query or transaction by repeating an operation or attempting a different operation (e.g., asking the user for input). As such, they represent a significant improvement over the tools available today.

As discussed above, supporting such capabilities is the tracking of contextual information (e.g., side-effecting actions) that is relevant to retrying operations or recovering from partially completed operations. Also advantageous is the fact that, as illustrated in the example of FIG. 2, such a process can be applied recursively to take advantage of new information. That is, aided by its understanding of context, such a system can integrate information obtained from previous stages of the process (e.g., through dialog) to resolve variables and ambiguities, recover from failed operations, and/or make decisions about how to proceed. And as should be appreciated, the approaches described herein enable effective operation even in the face of inconsistent or uncooperative users. That is, because it cannot be assumed that the user is cooperative, the ability to recover or attempt to solve a query in another way if one approach proves fruitless is advantageous.

According to some implementations, the system is also provided with the ability to respond to the user with natural language responses that may not require the user to respond. Such responses, useful for facilitating natural conversation flow, may or may not modify the context of a conversation and differ from questions or requests sent to the user in that they do not need to break the processing flow. Examples of this might be communications to the user like, "Please wait while I look for local train times," or "Thanks Let me think about that for a second."

A particular class of implementations employ query templates to translate natural language input to machine-readable queries and dialog templates as the primary mechanism for soliciting missing information from the user to complete the machine-readable queries. A particular use case will now be described to illustrate how such dialog templates may be employed. In this example, the natural language question "Am I overweight?" is translated as:

query
a [is the height of] [user]
b [is the weight of] [user]
bmi [is the bmi of] [group: a; b]
bmi [is greater than] [bmi: ["25"]]

in which the height and weight of the user are represented by variables a and b, the variable bmi (corresponding to body mass index) is represented as a function of a and b, and the generally accepted bmi value of 25 is used as the threshold for indicating an overweight condition. This translation matches a query template with the pattern:

query
a [is the height of] [user]
b [is the weight of] [user]
bmi [is the bmi of] [group: a; b]
bmi r t The query template also specifies actions required to fill in the variables a and b, pointing to dialog templates "height_template" and "weight_template", e.g.:

a→template(height_template)
b→template(weight_template)
query(query|bmi [is the bmi of] [group: a; b]|bmi r t)

In other words, dialog template "height_template" should be opened to acquire a value for variable a, and dialog template "weight_template" should be opened to acquire a value for variable b. The completed query would then be run to complete the dialog and provide an answer to the original question.

Dialog templates are configured to generate natural language questions soliciting missing information from the user. For example, the "height_template" might look like:

query
q [is the height of] [user]
q→output translation(query|[prompt] [is the height of] [user])

which would generate the natural language question, "How tall are you?" The "weight_template" would be similarly constructed to request the user's weight.

According to some implementations, dialog templates and the resulting natural language questions to the user are only invoked when there is no other way of satisfying a variable, e.g., the information is not available in an underlying knowledge base or in currently maintained contextual information associated with a current conversation. That is, during translation of the user's natural language question to a query which can be run against the knowledge base, any query templates that match the sequence of strings in the natural language question are run to populate a query that is compatible with the structured knowledge of the knowledge base. The templates also specify one or more "fallback queries" or "output translation queries" which, when run, solicit the missing information from the user or, in some cases, some other source. According to some implementations, there may be more than one possible fallback query with the queries being ordered by priority.

According to some implementations, a fallback query will only be executed if an associated "guard query" is executed first and the result of the execution of the guard query points to the fallback query. The guard and fallback queries might be set up such that the fallback query is executed only if execution of the guard query fails. For example, if the object of a fallback query is to solicit information from the user's account on a social network, a corresponding guard query might first determine whether credentials for accessing the user's social network account are available (and therefore the information may be retrieved without bothering the user). If the execution of such a guard query fails, the fallback query is executed and the system solicits the information from the user. If the guard query fails and the corresponding fallback query also fails, the system might then move on to the next guard/fallback query pair (if any).

Alternatively, and depending on the result of execution of the guard query, alternative fallback queries might be executed. In an example relating to a user's location, a guard query might determine whether the user's current location is known, e.g., because the GPS function of the user's mobile device is on. If the answer is "yes," then a fallback query might be executed to use the location information. If the answer is "no," a different fallback query might be executed which prompts the user for his location, e.g., "Where are you?"

According to some implementations, a guard query may be thought of as a query that attempts to satisfy an unknown variable by resorting to sources other than the user, e.g., an underlying knowledge base, a third party source via an API, the user's client device, etc. This is particularly useful if it is undesirable to bother the user with the request. However, if the information need cannot be satisfied through execution of the guard query, then the system moves to a fallback query that solicits the information from the user. Put another way, such systems are able to resort to multiple sources of knowledge including the user himself. This may be thought of as an API to the user's brain.

With most systems that attempt to perform query resolution, a failure at any stage typically prevents progression to further stages. By contrast, systems implemented as described herein augment conventional approaches to query processing with semantics that may be analogized to conditional if-else statements and looping. The side effects of running multiple queries are tracked as contextual information some of which may be temporary (e.g., maintained only during the current conversation), and some of which may be stored more permanently (e.g., as part of a user profile). One way to model the operation of a system implemented in accordance with these techniques is the recursive construction and processing of a data tree in which the nodes of the tree correspond to queries to be completed and processed.

Figure 3:
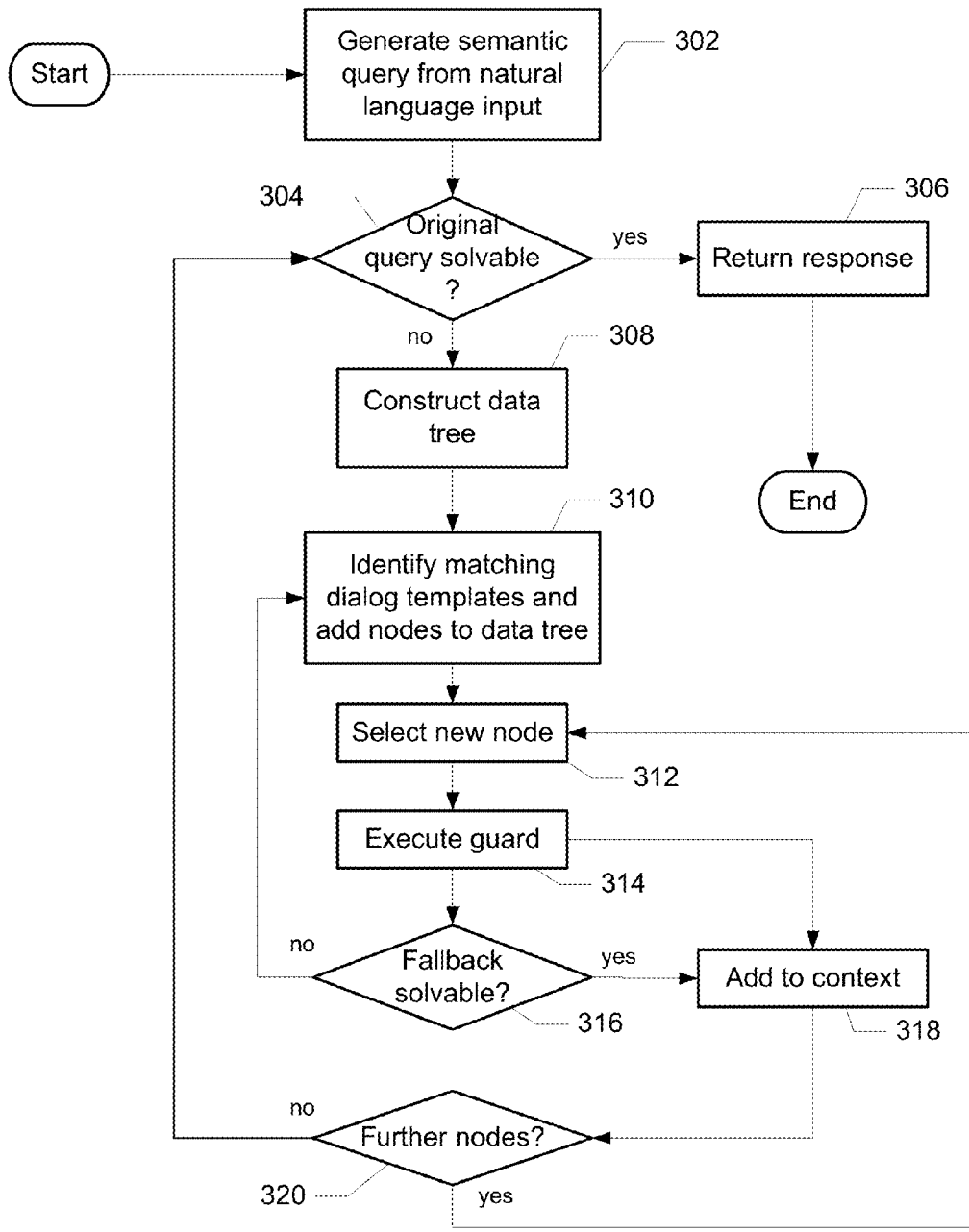
FIG. 3 illustrates an example of the processing of queries in support of a transaction.

According to such a model, the processing of a semantic query derived from natural language input might proceed, for example, as illustrated in FIG. 3. Following generation of a semantic query from natural language input (302), e.g., a question or a command, the system attempts to solve the query (304) and, if successful, returns an appropriate response (306). If solving of the query fails (e.g., the query includes an unsatisfied variable), a data tree is built with the root node holding the original query (308). A list of dialog templates is consulted for matches to the current query, and for each match a child node is added to the data tree (below the root node) that contains the parts of the query that matched along with other data from the dialog template (310).

Matching dialog templates include one or more fallback queries that when run may result in the generation of contextual information that allow other queries higher up the data tree to succeed on subsequent attempts. As discussed above, each fallback query is associated with a guard query. A guard query is a query that must be satisfied in some way (314), e.g., pass or fail as appropriate, in order for the system to be allowed to run the fallback query. In some cases, resolution of variables within the guard query are substituted into the fallback query before it is run. The process is repeated for the fallback query (316), treating it as a new root node and the process recurses. As described elsewhere herein, solving of a fallback query may involve requesting information from the user (not shown for the sake of simplicity). If there are no child nodes remaining to be solved (320), or attempts to solve have failed a predetermined number of times, the root query may be run again using any new facts added to the contextual information (318). A simple example will be instructive.

In this simple example, the natural language question "What time is it?" is translated to the semantic query:
   query time
   [current location] [applies to] location
   time [is the current time at] location This query cannot be immediately solved as the user's current location is transient. Looking for a matching dialog template the system finds that "[current location] [applies to] location" is a match. A corresponding child node is added to the data tree including the dialog template that matched (it is possible to match multiple dialog templates). In this simple example, a single fallback query is guarded by the guard query:
   query location
   location [is the current user location of] [user]

For the purposes of this example we assume that the query succeeds and the GPS coordinates of the user are bound to the variable location. The fallback query is therefore allowed to run. The fallback query looks like:
   factlist
   [current location] [applies to] location This fallback query indicates that this operation is not a query to be solved but a "fact list" to be added to the contextual information being tracked for this conversation. Fact list operations are assumed to succeed if variables can be bound (e.g., as the GPS coordinates of the user were bound to the variable location).

The system has no further nodes in the data tree to process in our simple example so it returns to the root and tries to solve the original query again; this time with the contextual information reflecting the fact "[current location] [applies to] [gps coords]." This new fact allows the first line to be solvable and for query processing to continue.

By using contextual information when executing guard queries, extensive chains of operations can be built that allow for very complex query/transaction resolution to be completed. This may include the ordering of constraints, e.g., when processing an order with an online retailer, taking the user's address before taking payment information may be important.

Continuing with the example above, it is possible that the system does not know how to determine the user's GPS coordinates. This may be handled by adding a second fallback query, the effect of which is to ask the user a question and wait for a response. According to a particular implementation, this is done by adding two flags to each data tree node created from a dialog template. The first flag indicates that the results of this query should be used to generate a response. The second flag indicates that processing should pause and wait for more input. By splitting these node attributes we can have multiple nodes that "talk" to the user without pausing until one of those nodes is a question or statement requiring a response from the user.

In addition to these flags, an "expectation fact," i.e., an indication that a response is expected, is temporarily added to the contextual information to facilitate interpretation of the user's responsive input. For example, a question to the user seeking a location such as "Where are you?" would likely result in a short response such as "London." Without the contextual knowledge of the question posed, and the fact that a response is expected, this utterance by the user might otherwise be interpreted by the system to mean any of a variety of different things. An expectation fact may take on a variety of forms, but a typical format might be something like "[ expected input] [applies to] [user location]." More generally, an expectation fact can be used to track anything outstanding in a current conversation. This includes whether either party, i.e., the system or the user, is waiting on input (e.g, response, command, confirmation, clarification) from the other.

The user's responsive utterances are translated from natural language and added to the contextual information being maintained as appropriate. And once such an utterance has been processed the data tree of query nodes is retrieved and processing continues as described above with any new query being solved and any new facts, either resulting from execution of the query or obtained from a fact list, being added to the contextual information.

According to a class of implementations in which an underlying knowledge base includes data about the possible responses and their relationships with each other, the system tracks the accuracy of the data required to solve a query. The system also independently tracks the accuracy of information provided by the user. This enables the system to use previous answers provided by the user (e.g., a user's response to the question "Where are you?") to answer a subsequent similar question from stored data, but only if the user provided sufficient data in the first answer.

According to some implementations, new query lines may be introduced into a semantic query such that ambiguity is resolved. The process involves taking a set of possible interpretations of a user utterance, applying some checks and then if appropriate, extracting the non-common elements. According to a particular implementation, it is determined whether the possible semantic representations of the user's utterance are structurally equivalent. This check is intended to ensure that the intent of the user's utterance is consistent across all the semantic representations. This may be done, for example, by verifying that each representation was generated from the same translation template. Differences in the detected entities within the query are ignored and are used as the elements that are not common between representations. Each such non-common entity is replaced by a variable and the set of entities that can take the place of that variable are stored. Once a consistent semantic representation is derived and one or more sets of possible entities to fill variables are stored, an additional query line is inserted into the semantic query for each set of entities. Each query line has a structure such that resolving it will select one value from the set of possibilities.

An example of such a query line for the question "What is the time in Cambridge?" might be:

ambiguous variable [is a disambiguation of the group]
[group: [cambridge uk]; [cambridge massachusetts]],
indicating that the entity "Cambridge" is ambiguous as between the one in the UK and one in the US. The system would process the query line as follows.

Initially, the processing of the query line would fail in that the system would not likely have access to information that resolves the ambiguity, i.e., it cannot divine the user's intent. But using the techniques described above, the system would recover from this failure and eventually run a query that presents a question to the user. In this example, the generation of that question would use the stored set of possible entities for the ambiguous variable to form a short list from which the user could select. An expectation fact would also be added to the contextual information indicating that a disambiguation response is expected.

On receiving a response from the user, the system would translate the response into a form capable of satisfying the query line, adding the translation to the contextual information. Another attempt would then be made to solve the query, this time with the added contextual information. Query processing would then proceed as normal.

In addition to the use of context, some implementations may refer to an ontology associated with an underlying knowledge base to resolve ambiguities. Such an ontology might represent knowledge as a set of concepts and relationships between pairs of the concepts including, for example, whether named entities are specific instances of one or more classes of entities. An understanding of such an ontology may be used instead of or in addition to contextual information and other information sources to resolve ambiguities. For example, a user might ask "What is the capital of Georgia?" The system could refer to the ontology of the underlying knowledge base to determine that the user might be referring to the southern state of Georgia in the United States or the independent Eurasian nation of Georgia. The system could then refer to other information to resolve the ambiguity (e.g., contextual information indicating the current dialog relates to the former Soviet Union, or user profile information indicating the user has an interest in the U.S. Civil War). Alternatively, the system could use its knowledge of the ontology to generate a natural language question asking the user to clear up the ambiguity, e.g., "Did you mean the U.S. state or the Eurasian republic?" It will be understood that the nature of the ontology to which the system might refer, as well as the manner in which the ontology may be employed to resolve ambiguity may vary considerably from implementation to implementation.

The foregoing examples are illustrative of implementations in which filling an information need using the structured data of a knowledge base is a primary system function.

And at least some of these implementations assume a knowledge base and query processing as described in U.S. Patent Publication Nos. 2007/0043708 and 2007/0055656 incorporated herein by reference above. However, as mentioned above, the present invention is not limited to facilitating dialog in support of question answering, but may be more generally characterized as supporting a transactional model in which satisfying an information need is one species of transaction. Other species may include, but are not limited to, purchasing a product or service, sending a message, initiating a communication session, initiating playback of a media file, making a reservation (e.g., at a restaurant, hotel, taxi service, etc.), or commanding a control system (e.g., turn system power on or off; enable, disable, or pause system operation, etc.). Another species might result in the execution of some kind of action in response to a command. For example, in response to a user saying "email Bob," the system could ask the user for Bob's email address or which Bob in the user's address book the user was referring to. In another example, in response to a user saying "buy song," the system could prompt the user for billing information in support of an online purchase. From these examples, it should be apparent that the types of transactions that may be supported by the dialog management techniques described herein is extremely diverse.

Some examples of conversations supporting transactions follow.

User: Send a message to Bob.
System: Would you like to send a text or an email?
User: A text message.
System: What should the message say?
User: My ETA is 5 minutes.
System: What is Bob's phone number? (or look it up in the phone)

or

User: Send a message to Bob.
System: Would you like to send a text or an email?
User: An email.
System: What is the subject?
User: The subject is "correct email etiquette"
System: What should the message say?
User: Please be careful not to send emails using capital letters.
System: What's Bob's email address?

These examples also illustrate how dialog management may support transactions that involve a variety of different types of applications (in this example, email and text messaging applications) with which dialog management logic may be integrated, or that dialog management logic may interface with via available APIs.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product for responding to natural language input using a knowledge base including structured data, the computer program product comprising one or more non-transitory computer-readable media having computer program instructions stored therein, the computer program instructions being configured such that, when executed, the computer program instructions cause one or more computing devices to:

receive a natural language question entered as input by a user;

generate a plurality of queries from the natural language question, the queries including a guard query, first fallback query, and a second fallback query, the guard query being configured to determine unknown information represented by a first variable of the guard query using a first information source other than the user, the first fallback query being configured to determine the unknown information represented by the first variable using a second information source other than the user, and the second fallback query being configured to determine the unknown information represented by the first variable by generating a natural language request to the user if the guard query and the first fallback query fail;

execute the guard query thereby generating a value for a second variable of the guard query;

determine that the unknown information represented by the first variable cannot be retrieved from the first information source based on a failure to resolve the first variable of the guard query;

substitute the value generated by execution of the guard query into the first fallback query;

determine by executing the first fallback query, that the unknown information represented by the first variable cannot be retrieved from the second information source;

generate, by executing the second fallback query, the natural language request for presentation to the user requesting the unknown information represented by the first variable;

receive responsive information corresponding to the natural language request;

determine the unknown information represented by the first variable from the responsive information; and generate a definitive answer to the natural language question.

2. The computer program product of claim 1, wherein the computer program instructions are further configured such that, when executed, the computer program instructions cause the one or more computing devices to determine whether the unknown information represented by the first variable can be retrieved without involving the user by referring to contextual information generated during a current interaction with the user.

3. A computer-implemented method for facilitating a transaction, comprising:

receiving input initiating the transaction;

generating one or more queries from the input, each of the queries including one or more variables representing unknown information required for the transaction to proceed, the one or more variables of the one or more queries including a first variable, a second variable, and a third variable;

for each variable in each query, determining whether the unknown information represented by the variable can be obtained from a first information source, the first information source comprising a knowledge base including structured data having a format compatible with the one or more queries;

for each variable for which the unknown information cannot be obtained from the first information source, determining whether the unknown information represented by the variable can be obtained from one or more of a plurality of alternate information sources, the alternate information sources including a user by whom the input was entered, and a remote information source that is remote from and independent of the knowledge base;

transmitting a first request for information to the remote information source;

receiving a response to the first request;

transmitting a second request for information to the device associated with the user;

receiving a response to the second request from the device, the response to the second request including input from the user;

determining the unknown information represented by each variable, including determining the unknown information represented by the first variable using the response to the first request, determining the unknown information represented by the second variable using the response to the second request, and determining the unknown information represented by the third variable using the knowledge base; and proceeding with the transaction.

4. The method of claim 3, wherein the one or more queries include a guard query and one or more fallback queries, the guard query and the fallback queries representing different mechanisms for determining the unknown information represented by the same variable, the method further comprising, only executing one of the one or more fallback queries as determined by execution of the guard query.

5. The method of claim 3, wherein transmitting the second request for information to the device associated with the user includes generating a natural language request for presentation to the user requesting the unknown information represented by the second variable.

6. The method of claim 3, wherein determining the unknown information represented by the second variable includes referring to contextual information generated during a current interaction with the user.

7. The method of claim 3, wherein determining the unknown information represented by the second variable includes determining whether the unknown information represented by the second variable can be retrieved from the remote information source.

8. The method of claim 3, wherein the transaction comprises one of the group consisting of filling an information need, purchasing a product, purchasing a service, sending a message, initiating a communication session, initiating playback of a media file, making a reservation, or commanding a control system.

9. The method of claim 3, wherein when execution of a first one of the one or more queries fails, re-executing the first query after adding to contextual information generated with reference to one or more of the alternate information sources.

10. The method of claim 9, wherein adding to the portion of the contextual information involves engaging in natural language dialog with the user.

11. The method of claim 3, further comprising interpreting input from the remote information source received while a response to the first request is outstanding using contextual information.

12. The method of claim 3, further comprising generating contextual information that includes a representation that a response to the first request is outstanding, and wherein the representation that a response to the first request is outstanding is an expectation fact in the machine-readable format of the knowledge base.

13. A computing system for facilitating a transaction, comprising:
a first information source comprising one or more data stores; and
one or more computing devices configured to:
receive input initiating the transaction;
generate one or more queries from the input, each of the queries including one or more variables representing unknown information required for the transaction to proceed;
for each variable in each query, determine whether the unknown information represented by the variable can be obtained from the first information source;
for each variable for which the unknown information cannot be obtained from the first information source, determine whether the unknown information represented by the variable can be retrieved from one or more alternate information sources;
receive first responsive information corresponding to a first variable from a first alternate information source;
identify alternate interpretations of the first responsive information using an ontology associated with the first information source, the ontology representing knowledge stored in the data stores of the first information source using classes and relationships among the classes; and
identify a correct one of the alternate interpretations as the unknown information represented by the first variable using contextual information generated during a current interaction with the user;
determine the unknown information represented by each variable other than the first variable with further responsive information from the first information source or the one or more alternate information sources; and
proceed with the transaction.

14. The computing system of claim 13, wherein the one or more queries include a guard query and one or more fallback queries, the guard query and the fallback queries representing different mechanisms for determining the unknown information represented by the same variable, the one or more computing devices being further configured to only execute one of the one or more fallback queries as determined by execution of the guard query.

15. The computing system of claim 13, wherein the first information source comprises a knowledge base including structured data having a format compatible with the one or more queries, and wherein the one or more alternate information sources include a user by whom the input was entered.

16. The computing system of claim 15, wherein the one or more variables of the one or more queries include the first variable and a second variable, and wherein the one or more computing devices are configured to determine whether the unknown information represented by the second variable can be retrieved from one or more alternate information sources by generating a natural language request for presentation to the user requesting the unknown information represented by the second variable.

17. The computing system of claim 15, wherein the one or more variables of the one or more queries include the first variable and a second variable, and wherein the one or more computing devices are configured to determine whether the unknown information represented by the second variable can be retrieved from one or more alternate information sources by referring to contextual information.

18. The computing system of claim 15, wherein the one or more variables of the one or more queries include the first variable and a second variable, and wherein the one or more computing devices are configured to determine whether the unknown information represented by the second variable can be retrieved from one or more alternate information sources by determining whether the unknown information represented by the second variable can be retrieved from a remote information source.

19. The computing system of claim 13, wherein the transaction comprises one of the group consisting of filling an information need, purchasing a product, purchasing a service, sending a message, initiating a communication session, initiating playback of a media file, making a reservation, or commanding a control system.

20. The computing system of claim 13, wherein when execution of a first one of the one or more queries fails, the one or more computing devices are further configured to re-execute the first query after adding to the contextual information.

21. The computing system of claim 20, wherein the one or more computing devices are configured to add to the contextual information by engaging in natural language dialog with a user by whom the input was entered.

22. The computing system of claim 13, wherein the one or more computing devices are further configured to, if the correct one of the alternate interpretations cannot be identified using the contextual information, generate a natural language request soliciting the correct one of the alternate interpretations.

* * * * *